Patented Sept. 4, 1951

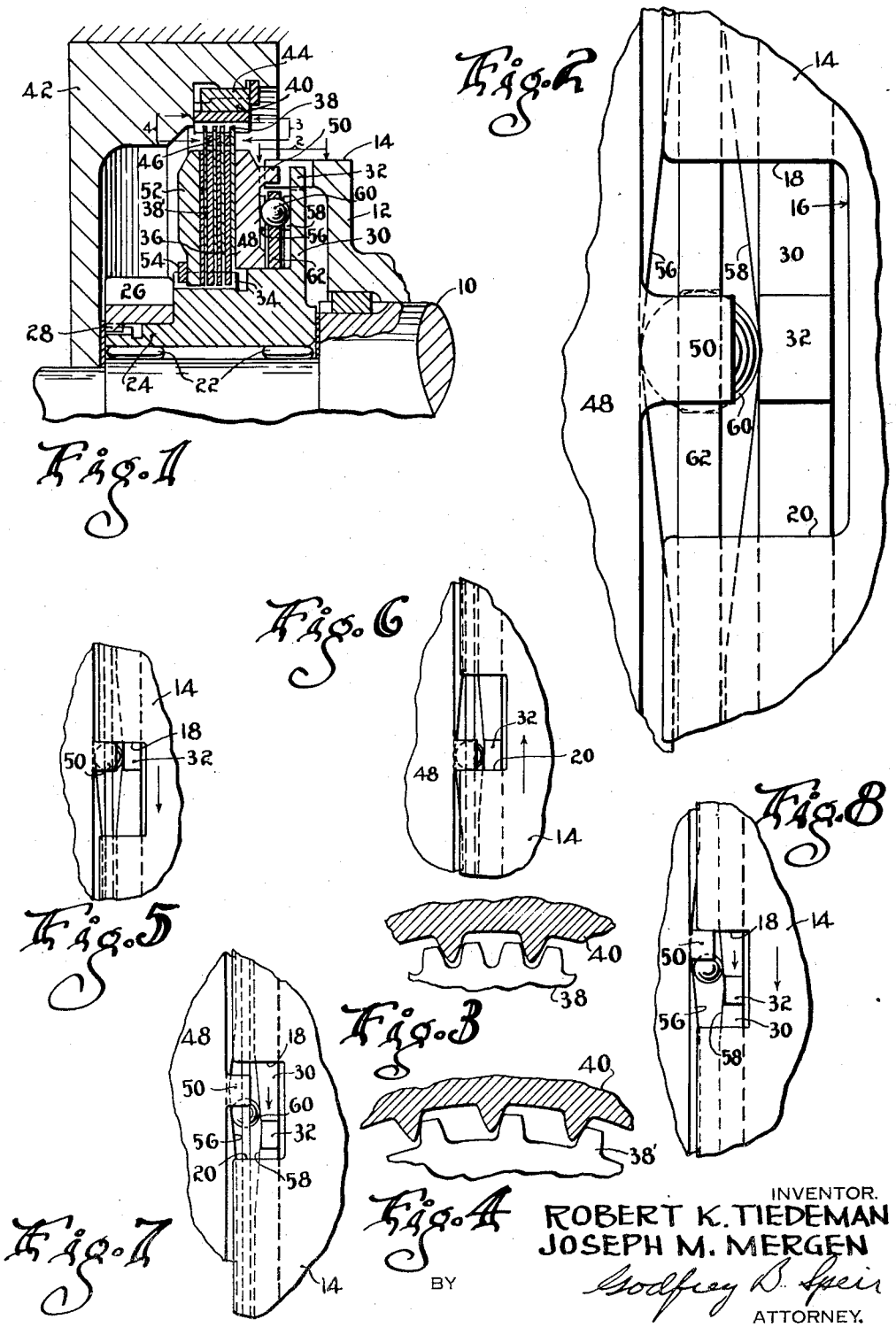

2,566,705

UNITED STATES PATENT OFFICE 2,566,705

BIDIRECTIONAL NO-BACK CLUTCH

Joseph M. Mergen, Verona, and Robert K. Tiedeman, Packanack Lake, N. J., assignors to Curtiss-Wright Corporation, a corporation of Delaware Application March 1, 1949, Serial No. 78,964

9 Claims. (Cl. 192—8)

This invention concerns drive couplings for mechanisms and provides particularly, a coupling for a bi-directional drive combined with a self-acting brake when the direction of drive is reversed from the load to the driver. For convenience the clutch may be called a bi-directional no-back clutch, the term "bi-directional" connoting a capability of the coupling to drive in either direction of rotation from a driving member to a driven member, and the "no-back" connoting an automatic lock or brake for the coupling should torque be applied to the driven member in excess of that furnished by the driving member, thereby locking the clutch or coupling against rotation.

An object of the invention is to provide a bi-directional no-back clutch having high brake capacity so that high torque loads applied to the driven member of the coupling can be absorbed in a brake to prevent rotation of the coupling. A further object of the invention is to provide means, in a bi-directional no-back clutch, wherein the brake may be released positively upon application of driving torque in excess of torque applied upon the driven member. Still another object of the invention is to provide a bi-directional no-back clutch in which the driving member may rotate in either direction to drive a driven member, while retaining the feature of braking the driven member if reverse torque applied thereto, in either direction, is in excess of torque being provided by the driving member.

Bi-directional no-back clutches of the type here described may be used in a number of different environments and mechanisms. One example of an environment for such a device is in the drive from a pitch changing motor to the blades of a controllable pitch aeronautical propeller. In such an environment, the pitch changing motor is capable of rotation in either direction to increase or decrease propeller blade pitch. When the motor is not operating, fixed pitch of the propeller blades should be maintained, without allowing creep of the blades to a different pitch. Such creep is usually urged, in a propeller, by the action of centrifugal twisting moments on the propeller blades.

Other objects of the invention will become apparent in reading the annexed detailed description in connection with the drawings, wherein similar reference characters designate similar parts and wherein Fig. 1 is a fragmentary longitudinal section through a clutch according to the invention;

Fig. 2 is an enlarged fragmentary view taken on the line 2 of Fig. 1;

Figs. 3 and 4 are enlarged fragmentary views taken respectively on the lines 3 and 4 of Fig. 1; and Figs. 5, 6, 7 and 8 are views, similar to Fig. 2, on the line 2 of Fig. 1, showing the mechanism in different positions of adjustment.

In the figures, 10 represents a driving shaft rotatable in either direction by any appropriate motive means such as an electric motor or a hydraulic motor. This shaft carries a member 12 having a driving flange 14 with one or more slots 16 formed therein, the circumferential ends of each slot as at 18 and 20 comprising driving abutments.

Piloted on an extension of the shaft 10 as by needle bearings 22 is a driven member 24 having an output element such as a gear or pinion 26 which may be integral therewith, or splined thereto as at 28. The driven member 24 includes a disc-like portion 30 having a driven dog 32 extending outwardly therefrom and lying within the slot 16, between the driving abutments 18 and 20. When the shaft 10 is rotated, either the abutment 18 or 20 will contact the driven dog 32, thereby driving the member 24.

The driven member 24 is provided with splines 34 upon which are mounted a plurality of brake discs 36 interleaved with stationary brake discs 38 peripherally engaged with a splined ring 40 secured in a stator housing 42 as by a key 44. Waved springs indicated at 46 are disposed between the several stator discs 38 to urge them apart, for disengagement of the discs 36 and 38 from one another when no braking pressure is applied. A brake pressure plate 48 is piloted on the driven member 24 and engages the end stator disc 38, said pressure plate including a dog 50 lying between the driving abutments 18 and 20 of the driving flange 14. A brake abutment is provided by a plate 52 secured against axial movement on the driving member 24 by a snap ring 54.

Facing portions of the pressure plate 48 and of the driven member flange 30 are provided with annular cam surfaces 56 and 58 respectively and rolling elements 60 are interposed between the cam faces 56 and 58, these rolling elements being supported and held in proper position by a roller retainer 62.

The cam faces 56 and 58 comprise one or more sets of shallow waved races, each wave being shaped as a shallow V. When the rotational position of the pressure plate 58 and driven member 24 are as shown in Figs. 2, 5 and 6, the rollers 60 are in the bottoms of respective cam V permitting the pressure plate 48 and the driven member element 30 to lie close to one another in an axial direction. If the pressure plate 48 and the driven member element 30 are displaced rotationally as in Figs. 7 or 8, the pressure plate is cammed away from the element 30 by the action of the rollers 60 on the cam faces 58 and 60, forcing the plate leftwardly as shown to bear against the brake discs and to apply braking torque to the driven member, said braking torque being absorbed through the brake discs and in the stator 42.

Fig. 5 shows the relative positions of the driving and driven elements when the driving flange 14 is being rotated in one direction as represented by the arrow. With this direction of drive, the drive abutment 18 engages the driven dog 32 and the pressure plate dog 50, alining the waved cams 56 and 58 for disengagement of the brake plates 36 and 38. If the direction of drive is reversed as shown in Fig. 6, the driving abutment 20 of the driving flange 14 engages the driven dog 32 and the pressure plate dog 48, still retaining the alinement of the waved cams 56 and 58 and holding the brake discs 36 and 38 disengaged.

If torque applied from the load end of the driven member 24 should exceed the driving torque provided from the member 12, the difference in torque will be absorbed in the brake. If the driving flange 14 is at rest, and if torque should be applied to the driven member from the load tending to reverse the drive through the system, the brake plates 36 and 38 will be engaged and the torque from the driven end will be absorbed in the stator 42. Reference may be made to Fig. 7 in which it is assumed that the driving flange 14 is stationary and that torque from the load end of the system is applied to the driven member 30 in the direction shown by the arrow, namely downwardly. The driven dog 32 moves downwardly from the driving abutment 18 and, since the pressure plate 48 is subject to friction drag through the brake plates from the stator, the pressure plate dog 50 will lag the movement of the driven dog 32 as shown. Thus, the dogs 32 and 50 are offset from one another and the cam faces 58 and 56 are correspondingly offset from one another whereupon the rollers 60 roll upon the cam tracks and spread them apart, pressing the pressure plate 48 into engagement with one brake disc 36 thereby pressing the other brake discs 36 and 38 into braking engagement. As more torque is applied from the load end of the driven member, the tighter will the brake plates be engaged with one another through the wedging action of the cams 56 and 58, thereby frictionally preventing reversal of rotation of the system from the driven end toward the driving end. If the direction of reverse drive tends to be opposite from that shown in Fig. 7, the relationship of the elements 32 and 50 and of the cam tracks would be reversed and the brake plates 36 (including 38') would be engaged to lock against drive reversal, in the same fashion as above described.

Fig. 8 shows a condition of operation in which the driving flange 14 has started to rotate while brake engagement existed and while reverse torque existed in the driven member 30. In this condition, the driving abutment 18 of the flange 14 will pick up the brake plate dog 50 and move it only against the friction between the plate 48 and the end plate 38 (much less than the friction of the entire brake), moving the cam faces 56 and 58 to release the entire brake and permitting movement of the driven member under the influence of the reverse driving torque, providing such torque will allow the driven member to rotate faster than the driving member. If driven member torque is excessive, the brake will adjust itself to snub the driven member, and to permit movement thereof only as called for by the rotational speed of the driving member. Thus, with the existence of the reverse driving torque the abutment 18 does not necessarily engage the driven member dog 32 to drive same. However, upon cessation of driving effort from the flange 14, the drive dog 32 will advance sufficiently to clear the pressure plate dog 50 from the abutment 18, relocking the brake and preventing drive reversal.

The waved springs 46 previously referred to spread the stationary brake plates 38 (and 38') apart from one another and urge a continuous light frictional engagement of the end stator disc 38 with the pressure plate 48, providing sufficient drag to afford prompt operation of the brake when a drive reversal tends to occur. To assist prompt brake releasing action, backlash is provided in the stationary brake discs 38' by the removal of alternate peripheral spline teeth therefrom as shown in Fig. 4. Alternate spline teeth are removed from the member 40 throughout its length so that with the removal of alternate teeth both from the ring 40 and from the brake discs 38', a backlash of one tooth pitch is permitted in the plates. In the right hand stationary disc 38, all of the peripheral teeth are provided as shown in Fig. 3, so that this disc has relatively no backlash with respect to the stator ring 40. The utility of this arrangement may be visualized from Figs. 3, 4 and 7, the brake in Fig. 7 being locked. If the driving abutment 20 should be moved upwardly, it will first contact the driven dog 32, moving it upwardly against the friction of the brake plate 38 but not against the plates 38' having backlash, these plates moving freely in the new direction. As the dogs 32 and 50 move toward alinement, the entire brake is relieved of pressure. Thus the backlash arrangement allows brake unlocking against the friction of only the one plate 38 instead of against all of the plates 38 and 38'. If the plates 38' had no backlash, brake unlocking torque would have to exceed the torque capacity of the entire brake assembly.

The arrangement of the several parts shown in the drawings is susceptible of considerable modification without departing from the spirit or scope of the invention and without departing from the essential functions attained in the invention.

Though but a single embodiment illustrating the invention has been illustrated and described, it is to be understood that the invention may be applied in various forms. Changes may be made in the arrangements shown without departing from the spirit or scope of the invention as will be apparent to those skilled in the art and reference should be made to the appended claims for a definition of the limits of the invention.

What is claimed is:

1. A drive coupling including a brake, comprising a fixed brake housing, a brake element secured thereto, a driving member rotatable in either direction and having a driving dog, a driven member having a driven dog loosely engageable with the driving dog with substantial angular backlash, said driven member being drivable in either direction through said dogs according to the driving direction of the driving member, a brake element secured to said driven member against rotational movement but having axial freedom, engageable at times with said fixed brake element, a brake pressure plate loosely mounted on said driven member and having a dog engageable with said driving dog, opposed sloped cams on each of said brake pressure plate and driven members, a rolling thrust element between and engaging said cams, said cams comprising shallow V-like notches so disposed as to have their apices alined axially when said brake and driven dogs are alined axially and axially movable elastic means urging said brake element axially into contact with said pressure plate for light frictional engagement and urging said pressure plate toward said driven member whereby said cams are urged toward alignment of their notches.

2. In a bi-directional drive coupling, a drive member, a driven member loosely engaged therewith and connected with a load, a brake element on said driven member and movable relative thereto, a brake stator engageable with said brake element, two-directional cam means carried by said driven member and by said brake element responsive to torque in both directions applied to said driven member from the load to engage said brake element and stator axially movable elastic means urging said brake stator axially into contact with said brake element for light frictional engagement and urging the brake element toward said driven member whereby said cam means are urged toward alignment.

3. In a bi-directional drive coupling, a drive member, a driven member loosely engaged therewith and connected with a load, a brake element on said driven member and movable relative thereto, a brake stator engageable with said brake element, two-directional cam means carried by said driven member and by said brake element responsive to torque in both directions applied to said driven member from the load to engage said brake element and stator, axially movable elastic means urging said brake stator axially into contact with said brake element for light frictional engagement and urging the brake element toward said driven member whereby said cam means are urged toward alignment and means on said drive member to disengage said brake element and stator upon driving torque application on said driving member superior to the torque from the load applied to said driven member.

4. In a bi-directional drive coupling, a drive member, a driven member loosely engaged therewith and connected with a load, a brake element on said driven member and movable axially and rotationally relative thereto, a brake stator engageable with said brake element, cam means carried by said driven member and by said brake element responsive to torque applied to said driven member in either direction from the load to engage said brake element and stator, said brake stator and element comprising multiple discs and said cam means on the brake element having a cam notch facing a corresponding notch on said driven member, roller means between and connecting said cam notches to effect relative axial movement thereof in response to relative rotational movement thereof and elastic means to aline said cam notches comprising wave springs between said multiple discs, urging them apart.

5. In a bi-directional drive coupling, a drive member, a driven member loosely engaged therewith and connected with a load, a brake element on said driven member and movable axially and rotationally relative thereto, a brake stator engageable with said brake element, cam means carried by said driven member and by said brake element responsive to torque applied to said driven member in either direction from the load to engage said brake element and stator, means on said drive member to disengage said brake element and stator upon driving torque application on said driving member superior to the torque from the load applied to said driven member, said brake stator and element comprising multiple discs and said cam means on the brake element having a cam notch facing a corresponding notch on said driven member, roller means between and connecting said cam notches to effect relative axial movement thereof in response to relative rotational movement thereof, and elastic means to aline said cam notches comprising wave springs between said multiple discs, urging them apart.

6. A bi-directional no-back drive coupling comprising a pair of circumferentially spaced driving dogs, a coaxial driven member having a dog disposed between the driving dogs, a brake pressure plate having a dog also disposed between the driving dogs, facing, waved, cam tracks on said driven member and on said pressure plate, said cam track waves lying opposite when said plate and driven dogs are alined axially, a rolling element between said cam tracks whereby, when said plate and driven member are displaced rotationally, said plate and driven member are spread apart, a stator, a brake disc carried thereby, a brake disc carried by the driven member arranged to be pressed against the stator brake disc by said brake pressure plate when the latter is spaced apart from the driven member, said pressure plate dog and driven dog being alinable by motion of the driving dogs in either direction to release said brake plates, said stator and movable brake discs being plural in number and having light drag springs therebetween.

7. A bi-directional no-back drive coupling comprising a pair of circumferentially spaced driving dogs, a coaxial driven member having a dog disposed between the driving dogs, a brake pressure plate having a dog also disposed between the driving dogs, facing, waved, cam tracks on said driven member and on said pressure plate, said cam track waves lying opposite when said plate and driven dogs are alined axially, a rolling element between said cam tracks whereby, when said plate and driven member are displaced rotationally, said plate and driven member are spread apart, a stator, a brake disc carried thereby, a brake disc carried by the driven member arranged to be pressed against the stator brake disc by said brake pressure plate when the latter is spaced apart from the driven member, said pressure plate dog and driven dog being alinable by motion of the driving dogs in either direction to release said brake plates, said stator and movable brake discs being plural in number and having light drag springs therebetween, the stator disc nearest said pressure plate having backlash relative to said stator.

8. A bi-directional rotary drive coupling and bi-directional no-back brake comprising a drive member having a driving element, a coaxial driven member having a driven element engageable loosely with the driving element allowing angular displacement of the members in the two directions of rotation, a brake anchor having a plurality of brake plates splined thereto, a plurality of brake plates splined to the driven member and interleaved with the anchor plates, elastic means urging said plates apart axially, a brake pressure plate bearing against the stack of brake plates and having driven elements loosely engaging said driving elements, said pressure plate and driven member having opposed V-shaped waved cam-ways with rollers therebetween bearing on both of the cam-ways, said elastic means, in urging said plates apart also urging said pressure plate and driven member to a certain definite circumferential position relative to each other wherein said rollers lie in the deepest parts of the respective V-shaped cam-ways on the plate and member.

9. A bi-directional rotary drive coupling and bi-directional non-back brake comprising a drive member having a driving element, a coaxial driven member having a driven element engageable loosely with the driving element allowing angular displacement of the members in the two directions of rotation, a brake anchor having a plurality of brake plates splined thereto, a plurality of brake plates splined to the driven member and interleaved with the anchor plates, elastic means urging said plates apart axially, a brake pressure plate bearing against the stack of brake plates and having driven elements loosely engaging said driving elements, said pressure plate and driven member having opposed V-shaped waved cam-ways with rollers therebetween bearing on both of the cam-ways, said elastic means, in urging said plates apart also urging said pressure plate and driven member to a certain definite circumferential position relative to each other wherein said rollers lie in the deepest parts of the respective V-shaped cam-ways on the plate and member, the anchor brake plate nearest said pressure plate having circumferential lost motion relative to said brake anchor.

JOSEPH M. MERGEN.
ROBERT K. TIEDEMAN.

REFERENCES CITED

The following references are of record in the file of this patent:

UNITED STATES PATENTS

| Number | Name | Date |
|---|---|---|
| 2,391,172 | Leland | Dec. 18, 1945 |